United States Patent
Kopp et al.

(10) Patent No.: US 10,454,337 B2
(45) Date of Patent: Oct. 22, 2019

(54) MOLDED HOUSING WITH A REINFORCEMENT ELEMENT

(71) Applicant: SIEMENS AKTIENGESELLSCHAFT, München (DE)

(72) Inventors: Florian Kopp, Seukendorf (DE); Mischa Maidorn, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 466 days.

(21) Appl. No.: 15/323,643

(22) PCT Filed: Jul. 1, 2015

(86) PCT No.: PCT/EP2015/064995
§ 371 (c)(1),
(2) Date: Jan. 3, 2017

(87) PCT Pub. No.: WO2016/001311
PCT Pub. Date: Jan. 7, 2016

(65) Prior Publication Data
US 2017/0155301 A1 Jun. 1, 2017

(30) Foreign Application Priority Data
Jul. 4, 2014 (EP) .................................. 14175839

(51) Int. Cl.
*H02K 5/20* (2006.01)
*F16M 1/04* (2006.01)
*H02K 5/06* (2006.01)

(52) U.S. Cl.
CPC ................. *H02K 5/20* (2013.01); *F16M 1/04* (2013.01); *H02K 5/06* (2013.01)

(58) Field of Classification Search
CPC ............... H02K 5/20; H02K 5/06; F16M 1/04
See application file for complete search history.

(56) References Cited

U.S. PATENT DOCUMENTS 5,783,892 A * 7/1998 Kanzaki ................... H02K 5/04
                                                    310/432
6,099,198 A    8/2000 Kotzur et al.
(Continued)

FOREIGN PATENT DOCUMENTS

CN    103548240 A    1/2014
EP    0 751 604 A2   1/1997
(Continued)

*Primary Examiner* — Jue Zhang
(74) *Attorney, Agent, or Firm* — Henry M. Feiereisen LLC (57) ABSTRACT

A molded housing for a machine includes a shaft, a first region, a second region, and a third region, a first passage for the shaft and a second passage. The first passage includes a first molded edge and the second passage includes a second molded edge. The second passage includes a reinforcement element running from a first connection point connected to the second molded edge to an opposite second connection point connected to the second molded edge. The second molded edge includes a first securing device at a third connection point and a second securing device at a fourth connection point. The second passage has an opening in a wall of the molded housing and a projection of an imaginary line connecting the third connection point to the fourth connection point into the opening intersects a projection of the reinforcement element into the opening at an acute angle.

17 Claims, 5 Drawing Sheets

(56) References Cited

U.S. PATENT DOCUMENTS

2012/0133221 A1* 5/2012 Leiber ..................... H02K 1/18
                                                    310/54
2014/0103756 A1    4/2014 Grillenberger et al.

FOREIGN PATENT DOCUMENTS

| EP | 2 301 137 B1 | 10/2012 |
| RU | 2155427 C1 | 8/2000 |
| RU | 2002100740 A | 8/2003 |
| RU | 2218516 C2 | 12/2003 |
| UA | 94806 C2 | 8/2011 |
| WO | WO 2014/075281 A1 | 5/2014 |

* cited by examiner

MOLDED HOUSING WITH A REINFORCEMENT ELEMENT

CROSS-REFERENCES TO RELATED APPLICATIONS

This application is the U.S. National Stage of International Application No. PCT/EP2015/064995, filed Jul. 1, 2015, which designated the United States and has been published as International Publication No. WO 2016/001311 A1 which claims the priority of European Patent Application, Serial No. 14175839.1, filed Jul. 4, 2014, pursuant to 35 U.S.C. 119(a)-(d).

BACKGROUND OF THE INVENTION

The invention relates to a molded housing for a machine with a shaft, especially for an electric machine with a shaft. The invention further relates to a machine with a shaft, especially to an electric machine with a shaft that the molded housing encloses. The invention further relates to a method for manufacturing the molded housing, a method for manufacturing the machine with the shaft, especially the electric machine with the shaft, a method for servicing the machine with the shaft, especially the electric machine with the shaft, and also to the use of a further reinforcement element for reinforcing the molded housing.

Such a molded housing is known from WO 2014/075281 A1. In this publication the molded housing for large electric motors with reinforcement components comprises two support sections and one connecting section, which connects the two support sections. The two support sections each have a cavity in which a ventilation opening is present. The two support sections and the connecting section have passages that are connected to one another. The reinforcement components with reinforcement structures are installed in the ventilation openings. One of the things that the reinforcement components installed in the ventilation openings does is to reduce a deformation of the ventilation openings caused by vibrations. In this way the strength of the molded housing for large electric motors is significantly increased. With the reinforcement components that have a reinforcement structure a molded housing with relatively thin walls and a simple structure is achieved without reducing the strength. This cuts costs in the area of material and manufacturing. In the exemplary embodiments of WO 2014/075281 A1 ventilation components are described having a frame that is mounted in the ventilation opening by means of a screw connection, a pin connection, an adhesive connection or a shrink fit. The frame specifies a frame opening that is divided up by the reinforcement structure into a plurality of opening portions. In the exemplary embodiments of WO 2014/075281 A1 the opening portions have a polygonal or triangular shape.

SUMMARY OF THE INVENTION

The underlying object of the invention is to make a technical contribution to a molded housing for a machine, especially for an electric machine, with which a low-cost and high-quality adaptation to a mechanical load resulting from operating the machine, especially the electric machine, is provided.

The object is achieved by a molded housing for a machine, and especially for an electric machine.

An inventive molded housing for a machine with a shaft, especially for an electric machine with a shaft has a first region, a second region and a third region one after another in an axial direction,
wherein the molded housing includes a first passage for the shaft and a second passage,
wherein the first passage has a first molded edge and the second passage has a second molded edge,
wherein the second passage has a reinforcement element,
wherein the reinforcement element runs from a first connection point with the second molded edge to an opposite second connection point with the second molded edge,
wherein the second molded edge has a first securing device at a third connection point and a second securing device at a fourth connection point,
wherein the second passage has an opening in a wall of the molded housing,
wherein a projection of an imaginary line connecting the third connection point to the fourth connection point intersects with a projection of the reinforcement element into the opening.

The object is also achieved by a machine, especially an electric machine. An inventive machine, especially an inventive electric machine, includes an inventive molded housing, wherein the machine, especially the electric machine, includes the shaft that passes through the first passage, wherein a rotor is fastened to the shaft, and a stator for interacting with the rotor is fixed in the second region of the molded housing, wherein the molded housing comprises the reinforcement element, the first securing device and the second securing device.

The object is also achieved by a method for manufacturing an inventive molded housing. In an inventive method for manufacturing an inventive molded housing the housing is manufactured with the reinforcement element, the first and the second securing device.

The object is also achieved by a method for manufacturing an inventive machine with a shaft, especially an electric machine with a shaft, as claimed in claim 13. In the method the molded housing, which comprises the reinforcement element, the first and the second securing device, is provided for a method step for manufacturing the machine, especially the electric machine.

The object is also achieved by a method for servicing. In an inventive method for servicing a machine with a shaft, especially an electric machine with a shaft, and an inventive molded housing, a further reinforcement element is fastened to or removed from the first and the second securing device, wherein the molded housing includes the reinforcement element, the first and the second securing device.

The object is further achieved by the use of a further reinforcement element. In an inventive use of a further reinforcement element for reinforcing a molded housing, especially a molded housing of an inventive machine, the further reinforcement element is fastened to the first and to the second securing de vice, wherein the molded housing includes the reinforcement element, the first and the second securing device.

In accordance with the invention the object is advantageously achieved by the molded housing for a machine with a shaft, especially in an electric machine with a shaft, in operation in a first type of setup, being able to withstand a mechanical load of the operation in the first type of setup advantageously adapted at low cost and with high quality. To this end the molded housing comprises the first passage with the first molded edge and the second passage with the second molded edge, wherein the second passage has the reinforcement element that runs from the first connection point with the second molded edge to the opposite second connection point with the second molded edge, wherein the second molded edge has the first securing device at the third connection point and the second securing device at the fourth connection point, the second passage has an opening in a wall of the molded housing, and a projection of an imaginary line connecting the third connection point to the fourth connection point intersects with a projection of the reinforcement element into the opening. Advantageously at low cost the molded housing, by installation of a further reinforcement element at the first and second securing device, can withstand in a high-quality manner a mechanical stress through operation of the machine, especially of the electric machine, adapted to a second type of setup. Advantageously the first or second type of setup can be adapted at low cost and with high quality for a specific setup location with its boundary conditions. A boundary condition can be the cost-effective use of the space at a specific setup location.

The projections are made in such cases on an imaginary surface, the edge of which is the second molded edge. The projection of the imaginary connecting line and the reinforcement element occurs in a direction from within the molded housing to the opening on the imaginary surface.

Advantageously the projection of the imaginary connecting line intersects with the projection of the reinforcement element at an acute angle. In this way, in the second type of setup, there can advantageously be a distribution of the mechanical stress to the reinforcement element and the further reinforcement element into advantageous force components, which make lower mechanical demands on the reinforcement element and the further reinforcement element.

Advantageously the molded housing can have a first support surface for supporting the molded housing during operation of the machine, especially operation of the electric machine, in a first type of setup and can have a second support surface for supporting the molded housing during operation of the machine, especially operation of the electric machine, in a second type of setup. In this way advantageously, at low cost and with high quality, through the first support surface and the second support surface on an inventive molded housing, the molded housing can be used for the first type of setup and for the second type of setup.

An inventive machine, especially an electric machine, has the further advantage that the performance of components of the inventive machine that are located within an inventive molded housing, in the first and in the second type of setup can be used almost to the same extent for output or consumption of energy on the shaft. Advantageously, for an operation of the inventive machine in the second type of setup neither do the components need to be significantly reduced in their dimensions, nor does the energy output or consumption of an inventive machine have to be restricted in the second type of setup for fear of damaging the molded housing or the machine or contravening safety regulations.

During operation of inventive machine the rotor is made to rotate around the axis of rotation and at the shaft to which the rotor is attached mechanical energy can be output to a mechanical load in the form of a rotational movement. The forces occurring in such cases through the interaction of the stator with the rotor lead to counter forces in the stator, which is fixed in the molded housing.

During operation of an inventive machine the machine can also be supplied with mechanical energy via the shaft, which also leads, through the interaction of the stator with the rotor, to corresponding counter forces at the stator.

The forces occurring through the interaction lead, during operation of an inventive machine, to a mechanical load, which in accordance with the invention a molded housing can advantageously withstand at low cost and with high quality.

In an inventive machine the shaft can be supported with the aid of a first bearing device and with the aid of a second bearing device relative to an inventive molded housing rotatable about an axis of rotation.

The inventive method for manufacturing an inventive molded housing has the further advantage that an inventive molded housing advantageously at low cost and with high quality can advantageously be produced in high volumes. The high volumes are produced at least from the sum of the volumes for the first and the second type of setup. Also advantageously tools, e.g. molds for the molding of the housing are only needed for one version of the molded housing, which can be used both for the first and also for the second type of setup.

An inventive method for manufacturing a machine with the shaft, especially an electric machine with a shaft, has the following advantage that advantageously the same molded housing can be provided for the first and the second type of setup. To a large extent the same components can be used. In this way an inventive manufacturing of an inventive machine with a shaft, especially an inventive electric machine with a shaft, is advantageously possible at low cost and with high quality, since the warehousing costs have a lower dependency on the different demands on electrical machines in the first and the second type of setup. Furthermore an inventive manufacturing of an inventive machine with a shaft, especially an inventive electric machine with a shaft, is advantageously possible at low cost and with high quality, since the warehousing costs for the components, because of the small variation in the components, are lower and also the danger of installing an incorrect component is lower.

For servicing a machine, especially an electric machine, work on the machine, especially the electric machine, is carried out at intervals in relation to its manufacturing.

An inventive method for servicing a machine with the shaft, especially an electric machine with a shaft, has the further advantage that an existing inventive molded housing or an existing inventive machine can advantageously be adapted at low cost and with high quality to a type of setup, when these are to be used in a different type of setup to that originally intended or to that which was the case.

An inventive use of the further reinforcement element has the further advantage that an available inventive molded housing or an available inventive machine, especially electric machine, can advantageously be adapted in a simple manner to a type of setup just by one reinforcement element and associated securing element at low cost and with high quality.

Advantageous embodiments of the invention are specified in the dependent claims.

In this way an embodiment of an inventive molded housing in which the reinforcement element is connected in a material-to-material connection to the molded housing is advantageous. In this way advantageously at low cost and with high quality the molded housing and the reinforcement element can be molded in one piece. Advantageously here distinct edges can be avoided on the reinforcement element. This advantageously leads to high quality since a low resistance to a flow of coolant is present if the second passage is used for cooling the machine, especially the electric machine with a flow of coolant. Advantageously the reinforcement element between the first and the second connection point can run not in parallel to the axial direction. In this way advantageously in operation of an inventive machine, especially of an inventive electric machine, the reinforcement element can advantageously withstand a load in the first and second type of setup. In this way it can advantageously be achieved that the reinforcement element, on occurrence of torques about the axis of rotation of the shaft, is predominantly subjected to a tension/compression instead of a pure shearing stress and consequently to a reduced bending stress.

The reinforcement element can be a strut. In this way the reinforcement element can advantageously be manufactured at low cost and with high quality with a low material requirement and can occupy a small space in the second passage.

The reinforcement element can be located within the molded housing within the second passage and, in a direction to an opening of the second passage on the molded housing can be at a distance from the imaginary connecting line. Advantageously at low cost, for an inventive manufacturing and an inventive service, the molded reinforcement element does not have to be installed and can advantageously be present at low cost with a small space requirement within the molded housing in the second passage.

In a further advantageous embodiment of an inventive molded housing a further reinforcement element runs from the third to the fourth connection point, wherein the further reinforcement element is fastened to the first and the second securing device. The further reinforcement element can in this way advantageously magnify a torsional stiffness of an inventive molded housing for a higher mechanical load. Advantageously the further reinforcement element can be a strut. In this way the further reinforcement element can advantageously be manufactured at low cost and with high quality with a small material requirement and can require little space when present on an inventive molded housing.

In a further advantageous embodiment of an inventive molded housing a further reinforcement element can be fixed to the first and the second securing device in a form fit. Advantageously, at low cost and with high quality, a high torsional stiffness can be present in this way for dynamic loading. The form-fit fixing causes a lower relative displacement of the further reinforcement element relative to the first or to the second securing device than a screw connection in the event of a dynamic load for example. Advantageously the further reinforcement element can be fixed to the first and the second securing device by a form fit and can be fastened there with securing elements. In this way, advantageously at low cost and with high quality, there can be a durable connection between the further reinforcement element and the first or the second securing device.

With a further advantageous embodiment of an inventive molded housing, the first and the second securing device are connected by a material-to-material fit to the molded housing. In this way advantageously at low cost and with high quality, the molded housing, the reinforcement element, the first and the second securing device can be molded in one piece.

The first and the second securing device can terminate in a flush fit with an external surface of a wall of the molded housing. In this way advantageously, at low cost and with high quality, the first and the second securing device can be present for a possible adaptation to a mechanical load on the molded housing. Inter alia an inventive manufacturing of the molded housing with the first and second securing device can be undertaken at low cost with high quality and for an inventive machine, especially an electric machine, an inventive method for servicing or an inventive use of the further reinforcement element, the further reinforcement element can be fastened or already be fastened in a space-saving and simple manner advantageously at low cost and with high quality to the first and second securing device.

The molded housing can have circular recesses on the first and second securing device, which, for fastening the further reinforcement element, serve to predetermine the position of the holes for fastening said element. In this way there can be an advantageous low-cost, high quality predetermination of the holes for securing the further reinforcement element without said holes having to be drilled during inventive manufacturing of the molded housing.

The first and the second securing device can have a hole with a thread. In this way the further reinforcement element can advantageously be fastened, at low cost and with high quality, for adaptation to a mechanical load of the molded housing.

In a further advantageous embodiment of an inventive molded housing a second reinforcement element runs from a fifth connection point with the second molded edge to an opposite sixth connection point with the second molded edge, wherein the second molded edge has a third securing device at a seventh connection point and a fourth securing device at an eighth connection point, wherein a projection of a second imaginary connecting line between the seventh and the eighth connection point into the opening intersects with a projection of the second reinforcement element into the opening, wherein the reinforcement element and the second imaginary connecting line are oriented in similar directions to one another and the second reinforcement element and the imaginary connecting line are oriented in similar directions to one another. In this way, advantageously at low cost and with high quality, a high mechanical loading of the inventive molded housing, especially during operation in the second type of setup, can be achieved with a low probability of damage for the molded housing. The projections are also made in this advantageous embodiment in the direction from within the molded housing to the opening on the imagined surface.

The further reinforcement element can advantageously have a greater strength than the molded material of the molded housing. In this way, through the further reinforcement element with its direction oriented similarly to the second reinforcement element, the probability of a mechanical overload culminating in a fracture of the second reinforcement element can advantageously be very small. In the advantageous distribution of forces to the further reinforcement element and the second reinforcement element, with an increased mechanical loading of the second reinforcement element, the further reinforcement element advantageously accepts a greater proportion of the force compared to the proportion assumed by the second reinforcement element. This can advantageously occur by the second reinforcement element experiencing a stronger expansion or compression than the further reinforcement element when affected by a force.

Also advantageously, through a second further reinforcement element that runs from the seventh connection point to the eighth connection point and is fastened to the third securing device and to the fourth securing device, advantageously at low cost and with high quality with the two crossed arrangements for the second type of setup or with the first and second reinforcement element for the first type of setup, an adapted, homogeneous distribution of a force introduction of the mechanical load into the second molded edge is achieved.

In a further advantageous embodiment of an inventive molded housing an opening of the second passage extends on the molded housing in the axial direction predominantly within the first support surface. In this way, advantageously at low cost and with high quality, a mechanical load in the first type of setup can be achieved with a lower probability of damage for an inventive molded housing, without a further reinforcement element being necessary.

The molded housing can have the first support surface in the first region and a further first support surface in the third region. In this way, advantageously at low cost and with high quality, forces in operation of an inventive machine, especially an inventive electric machine, can be supported distributed in the first type of setup in an axial direction in the first region via the first support surface and in the third region via the further first support surface.

Support devices for the first type of setup can be attached to the first and the second support surface. In this way an inventive molded housing can advantageously be adapted, at low cost and with high quality, to a specific setup location.

In a further advantageous embodiment of an inventive molded housing an opening of the second passage extends on the molded housing in the axial direction predominantly between a second support surface and the second region. In this way, advantageously at low cost and with high quality, the second support surface can be used for support for the second type of setup.

The molded housing can have only one second support surface for supporting the molded housing during operation of the machine, especially the electric machine, in the second type of setup. In this way an inventive molded housing, in the second type of setup, at low cost and with high quality, can just be supported in a space-saving manner on the second support surface. For this purpose a support device for the second type of setup can advantageously be attached to the second support surface. The support device advantageously makes possible a low-cost, high-quality adaptation to a specific setup location.

In a further advantageous embodiment of an inventive molded housing the molded housing has the second support surface on an axial outer surface of an axial wall of the molded housing. In this way, in the second type of setup, advantageously at low cost, there can be a high-quality fastening to a device to be driven or, in generator mode, to a driving device in a space-saving manner with low material requirements. Advantageously an inventive molded housing with the further reinforcement element for said housing can withstand the mechanical stress for a vertical alignment of the shaft with a low probability of damage. The designation axial in this case stands for the predominant orientation of the normal vectors on the axial outer surface, which defines its alignment. The axial outer surface has an opening of the first passage for a shaft that can extend in an axial direction through the opening.

Advantageously a support device with a flange can be attached at low cost to the second support surface of the molded housing.

In a further advantageous embodiment of an inventive molded housing the second passage can be located in the first area. Advantageously at low cost, for a mechanical stress in the first and second type of setup, the second passage can extend in a large cross section to a large opening of the molded housing in the first area. In this way the second passage can advantageously be used for high-quality cooling of the machine, especially the electric machine, for different types of setup and embodiment of an inventive machine, especially of an inventive electric machine.

The third region can have a third passage with an opening on the molded housing. In this way, advantageously at low cost, a type of embodiment of an inventive machine, especially of an inventive electric machine, can be provided in which a coolant, especially air, can flow through the opening of the second passage into an inventive machine, especially an inventive electric machine, can cool the second region, especially the stator and/or rotor, and can flow out via the opening of the third passage. Advantageously at low cost the third passage can withstand a mechanical load of operation in the first or second type of setup advantageously, at low cost and with high quality in accordance with the invention like the second passage with the reinforcement element and, depending on the type of setup, adapted embodied with the further reinforcement element.

The molded housing can have a further passage in the second region with an opening on the molded housing. In this way, advantageously at low cost, a second type of embodiment of an inventive machine, especially of an inventive electric machine, can be provided, in which through the opening of the second passage and of the third passage, a coolant, especially air, can flow into an inventive machine, especially an inventive electric machine, can cool the second region, especially the stator and/or rotor, and can flow out via the opening of the further passage. Advantageously struts can be attached here at low cost to the opening of the third passage for the mechanical stresses occurring, so that the molded housing withstands the mechanical stresses in a high-quality manner. In a first type of embodiment of an inventive machine, especially of an inventive electric machine, in which the coolant flows through the opening of the second passage into the molded housing and leaves the molded housing through the opening of the third passage, the opening of the third passage can advantageously be closed off by a plate at low cost and with high quality.

Advantageous embodiments of the inventive molded housing, inventive machines, inventive electric machines, an inventive method for manufacturing an inventive molded housing, machines or electric machines, an inventive method for servicing a machine, especially an electric machine, and also inventive uses of a further reinforcement element, are advantageously produced by the combination of a few or a number of described features.

BRIEF DESCRIPTION OF THE DRAWING

The characteristics, features and advantages of this invention described above, as well as the manner in which they are achieved, will become clearer and easier to understand in conjunction with the description given below of the exemplary embodiments, which are explained in greater detail with reference to the figures, in which.

DETAILED DESCRIPTION OF THE EMBODIMENTS

Figure 1:
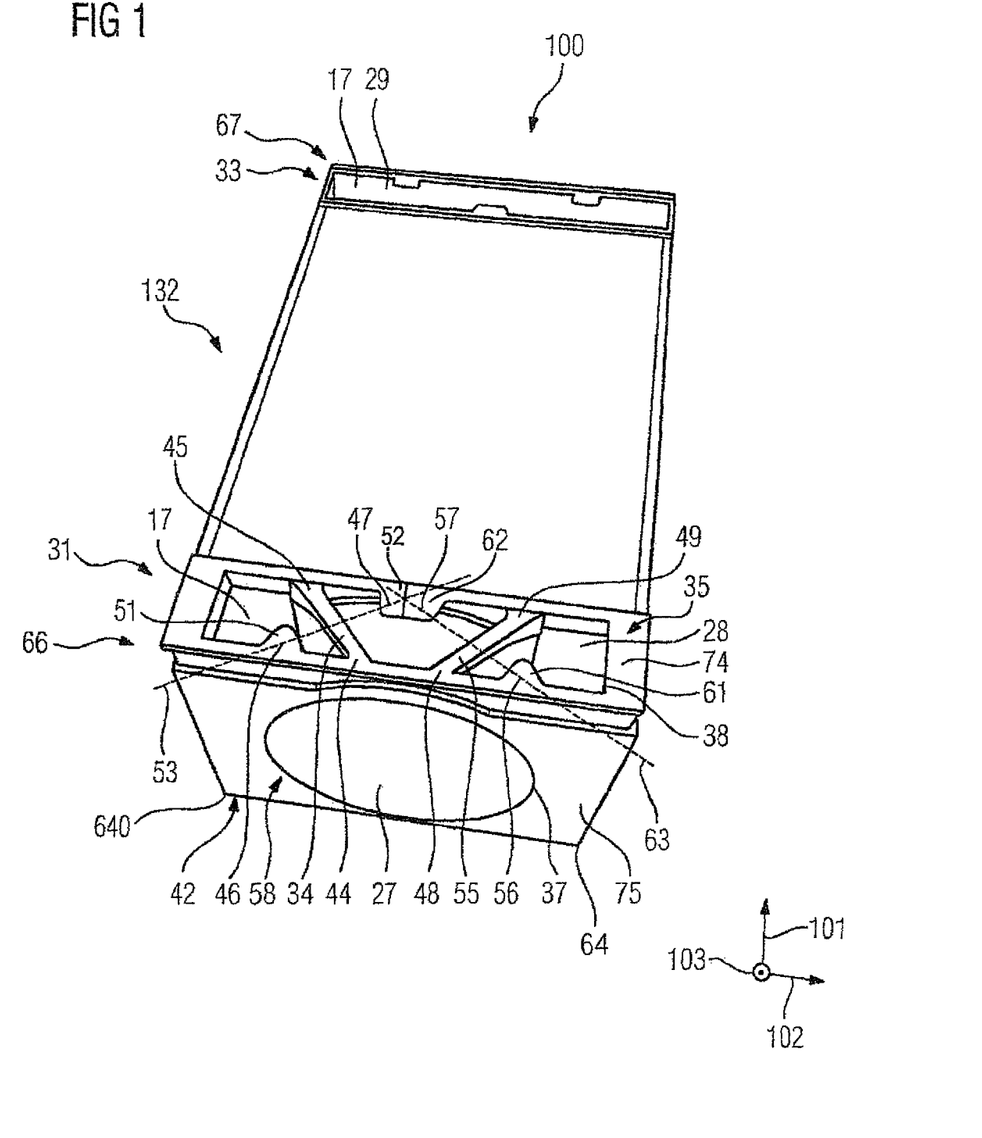
FIG. 1 shows an exemplary embodiment of a molded housing.

FIG. 1 shows an exemplary embodiment of a molded housing 100. The molded housing 100 for a machine 40 with a shaft 2, especially for an electric machine 40 with a shaft 2, has a first region 31, a second region 132 and a third region 33 following on from each other in an axial direction 101. The molded housing 100 comprises a first passage 27 for the shaft 2 and a second passage 28, wherein the first passage 27 has a first molded edge 37 and the second passage 28 has a second molded edge 38. The second passage 28 has a reinforcement element 34, wherein this runs from a first connection point 44 connected to the second molded edge 38 to an opposite second connection point 45 connected to the second molded edge 38. The second molded edge 38, at a third connection point 46, has a first securing device 51 and at a fourth connection point 47 a second securing device 52. The second passage 28 has an opening 17 in a wall 74 of the molded housing 100. In the exemplary embodiment in accordance with FIG. 1 the wall 74 has the outer surface 35. A projection of an imaginary line 53, connecting the third connection point 46 to the fourth connection point 47, into the opening 17 intersects with a projection of the reinforcement element 34 into the opening 17. The projections are made in this case on an imaginary surface, the edge of which is the second molded edge 38. The projection of the imaginary connecting line 53 and of the reinforcement element 34 is made in a direction 103 from within the molded housing 100 to the opening 17 on the imaginary surface. In the exemplary embodiment of FIG. 1 the direction 103 is oriented perpendicular to the axial direction 101.

The reinforcement element 34 is connected to the molded housing 100 by a material-to-material bond. The molded housing 100 according to the exemplary embodiment of FIG. 1 is molded in one piece. The molded housing 100 has a second reinforcement element 55, which is connected to the molded housing 100 by a material-to-material bond. The reinforcement element 34 and the second reinforcement element 55 run in the second passage 28 diagonally in the direction of the second region 132 away from one another. In this way, advantageously at low cost and with high quality, in a first setup type the molded housing 100 can withstand a mechanical stress to the same extent, regardless of the direction of rotation of the shaft about the axial direction. The molded housing 100 extends in the axial direction 101 from a first axial end 66 of the molded housing 100 to a second axial end 67 of the molded housing 100.

The reinforcement element 34 and the second reinforcement element 55 are located inside the molded housing 100 within the second passage 28 and are spaced apart from one another in the direction 103 towards an opening 17 of the second passage 28 on the molded housing 100 by the imaginary connecting line 53 and a second imaginary connecting line 63. The first securing device 51 and the second securing device 52 are connected to the molded housing 100 by a material-to-material bond. The first securing device 51 and the second securing device 52 make a flush connection with an outer surface 35 of the molded housing 100. The second reinforcement element 55 runs from a fifth connection point 48 connected to the second molded edge 38 to an opposite sixth connection point 49 connected to the second molded edge 38, wherein the second molded edge 38 has a third securing device 61 at a seventh connection point 56 and a fourth securing device 62 at an eighth connection point 58. A projection of the second imaginary connecting line 63 between the seventh connection point 56 and the eighth connection point 58 into the opening 17 intersects with a projection of the second reinforcement element 55 into the opening 17, wherein the reinforcement element 34 and the second imaginary connecting line 63 are oriented in similar directions to one another and the second reinforcement element 55 and the imaginary connecting line 53 are oriented in similar directions to one another. Here too the projections are made in the direction 103 from within the molded housing 100 to the opening 17 on the imaginary surface. The opening 17 of the second passage 28 on the molded housing 100 extends in the axial direction 101 predominantly within a first support surface 42 of the molded housing 100.

In other words: If the opening 17 of the second passage 28 is projected onto the first support surface 42, the opening 17 of the second passage 28 intersects with a surface from the first support surface 42, wherein the support surface does not have to extend, especially in a direction 102 perpendicular to the axial direction 101, from a first end to a second end of the molded housing 100, but can be interrupted between the two. In this way an exemplary embodiment of a molded housing can have a foot in each case at the first end 640 and at the second end 64, which supports the molded housing 100 over the entire length of the opening 17 of the first passage 28 in the axial direction 101 and in this way forms the first support surface 42. When the opening 17 of the second passage 28 on the molded housing 100 extends in the axial direction 101 within a first support surface 42 of the molded housing 100, an edge of the first support surface 42 remains, at least in the axial direction 101. When the opening 17 of the second passage 28 on the molded housing 100 in the axial direction 101 extends predominantly within a first support surface 42 of the molded housing 100, the opening 17 extends in the axial direction 101 with a slight axial overhang beyond the first support surface 42. In this case predominantly is to be understood as the first axial overhang being negligible compared to the extent of the opening 17 in the axial direction 101. This is the case when the axial overhang does not lead to a significantly smaller ability to withstand a mechanical load of the molded housing 100 in its first type of setup than with an almost identically embodied molded housing 100 without axial overhang. The opening 17 of the second passage 28 on the molded housing 100 extends in the axial direction predominantly between a second support surface 58 and the second region 132. The second passage 28 is located in the first region 31. Advantageously at low cost, for a mechanical stress in a first and second type of setup, the second passage 28 extends in a large cross-section to a large opening 17 of the molded housing 100 in the first region 31. The opening 17 of the second passage 28 can in this way almost occupy the entire region in a direction 102 between the first end 640 and the second end 64 of the molded housing 100. The third region 33 has a third passage 29 with an opening 17 on the molded housing 100. Advantageously at low cost the third passage 29 can withstand a mechanical load of operation in the first or second type of setup with high quality in accordance with the invention adapted like the second passage 28.

Figure 2:
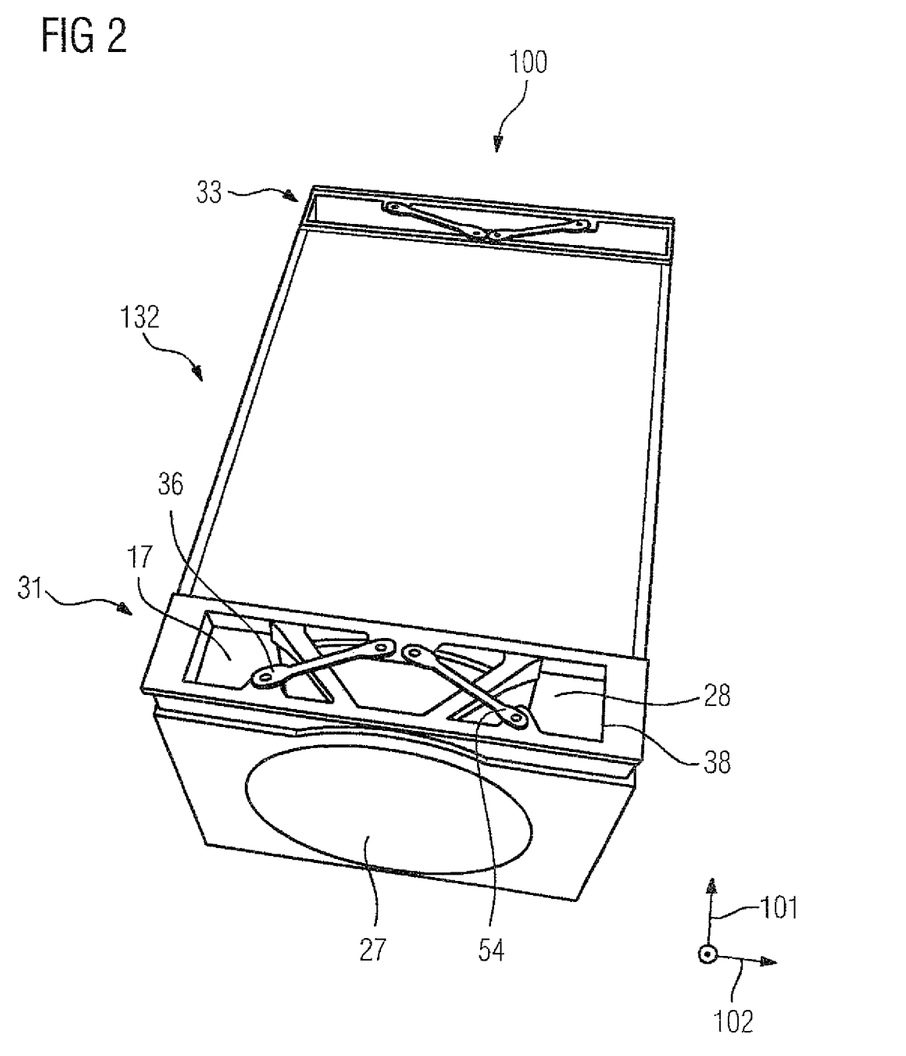
FIG. 2 show the exemplary embodiment from FIG. 1 with a further reinforcement element, which runs from a third to a fourth connection point.

FIG. 2 shows the exemplary embodiment from FIG. 1 with a further reinforcement element 36, which runs from a third connection point 46 to a fourth connection point 47, wherein the further reinforcement element 36 is fastened to the first and to the second securing device 51 and 52. In the molded housing 100 a second further reinforcement element 54 additionally runs from the seventh connection point 56 to the eighth connection point 57, wherein the second further reinforcement element 54 is fastened to the third securing device 61 and to the fourth securing device 62. The further reinforcement element 36 and the second further reinforcement element 54 are individual steel struts that run diagonally between the securing devices. The steel struts have a greater strength than the molded material of the molded housing 100. The steel struts advantageously have a narrowing of their cross-section outside their securing areas. The securing areas of the metal/steel struts have holes, which make a screw connection to the first, second, third and fourth securing device possible. In addition or as an alternative to a screw connection, the further reinforcement element 36 and the second further reinforcement element 54 can be fixed to their securing devices using a form fit. To this end holes can be provided on the securing devices 51, 52, 61, 62 and on the further reinforcement element 36 and the second further reinforcement element 54, into which pins are inserted into a shaped hole in a form fit, which leads to a form-fit fixing of the further reinforcement element 36 to the first securing device 51 and to the second securing device 52. This can be done in a similar way for fixing the second further reinforcement element 54 to the third securing device 61 and to the fourth securing device 62. The form-fit fixing with the pins causes a lower relative displacement of the further reinforcement element 36 or of the second further reinforcement element 54 relative to the securing devices 51, 52, 61, 62 than for a pure screw connection subjected to shear bearing stress.

Figure 3:
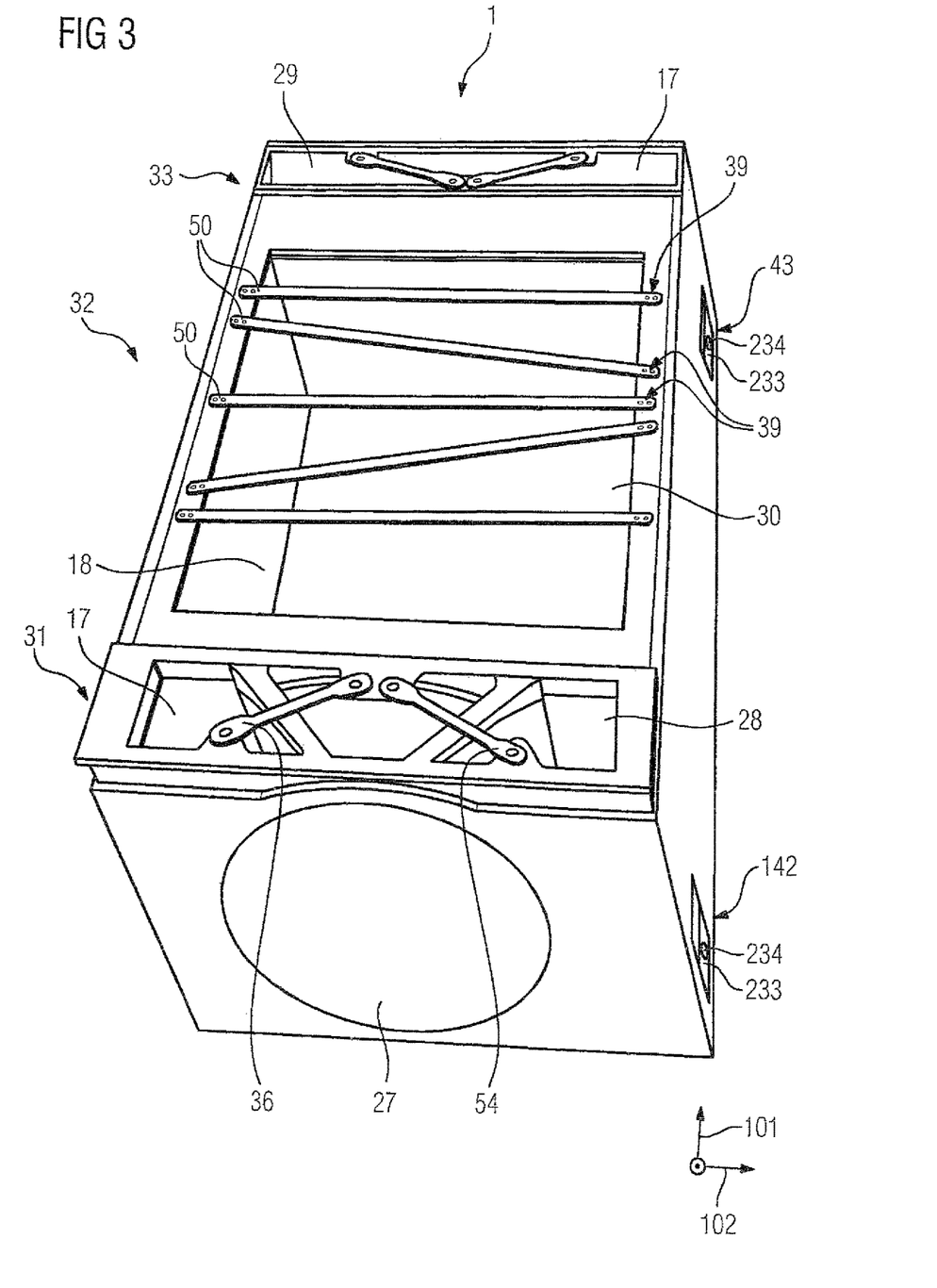
FIG. 3 shows a further exemplary embodiment of a molded housing.

FIG. 3 shows a further exemplary embodiment of a molded housing 1. Many features here are identical to those in the exemplary embodiment of the molded housing 100 in FIG. 1 and FIG. 2. These identical features have already been illustrated as part of the description of FIG. 1 and FIG. 2 and do not have any reference numbers or have the same reference numbers in FIG. 3. Compared to the exemplary embodiment of FIG. 1 and FIG. 2, the molded housing 1 has a further passage 30 in the second region 32 with an opening 18 on the molded housing 1. In a first type of embodiment of an inventive machine, especially of an inventive electric machine, in which a flow of coolant, especially air, flows through the opening 17 of the second passage 28 into the molded housing 1 and flows out of the molded housing 1 through the opening 17 of the third passage 29, the opening 18 of the further passage 30 is closed off by a plate. In a second type of embodiment of an inventive machine, especially of an inventive electric machine, the plate is not present, so that a coolant, especially air, can flow into or out of the molded housing 1 through the opening 18 of the further passage 30. In the second type of embodiment the coolant, especially air, can flow into an inventive machine, especially an inventive electric machine, through the openings 17 of the second and third passage 28, 29, can cool the second region and can flow out via the opening of the second passage 30. Advantageously at low cost the molded housing 1, for the second type of setup, can withstand the mechanical stresses occurring through a number of steel struts 50 which are arranged and fastened in a framework-type structure to the opening 18 of the further passage 30. The steel struts 50 are fastened with screws and pins to securing devices 39 of a molded edge of the further passage 30. Support devices for a first type of setup have recesses 233 with holes 234 on the molded housing 1. If necessary for a specific type of setup the holes 233 can be used for screws, so that the molded housing 1 is supported on a first support surface 142 and on a further first support surface 43 defined for operation in the first type of setup. For this the holes 234 are located in the axial direction within the first support surface 142 or the further first support surface 43.

Figure 4:
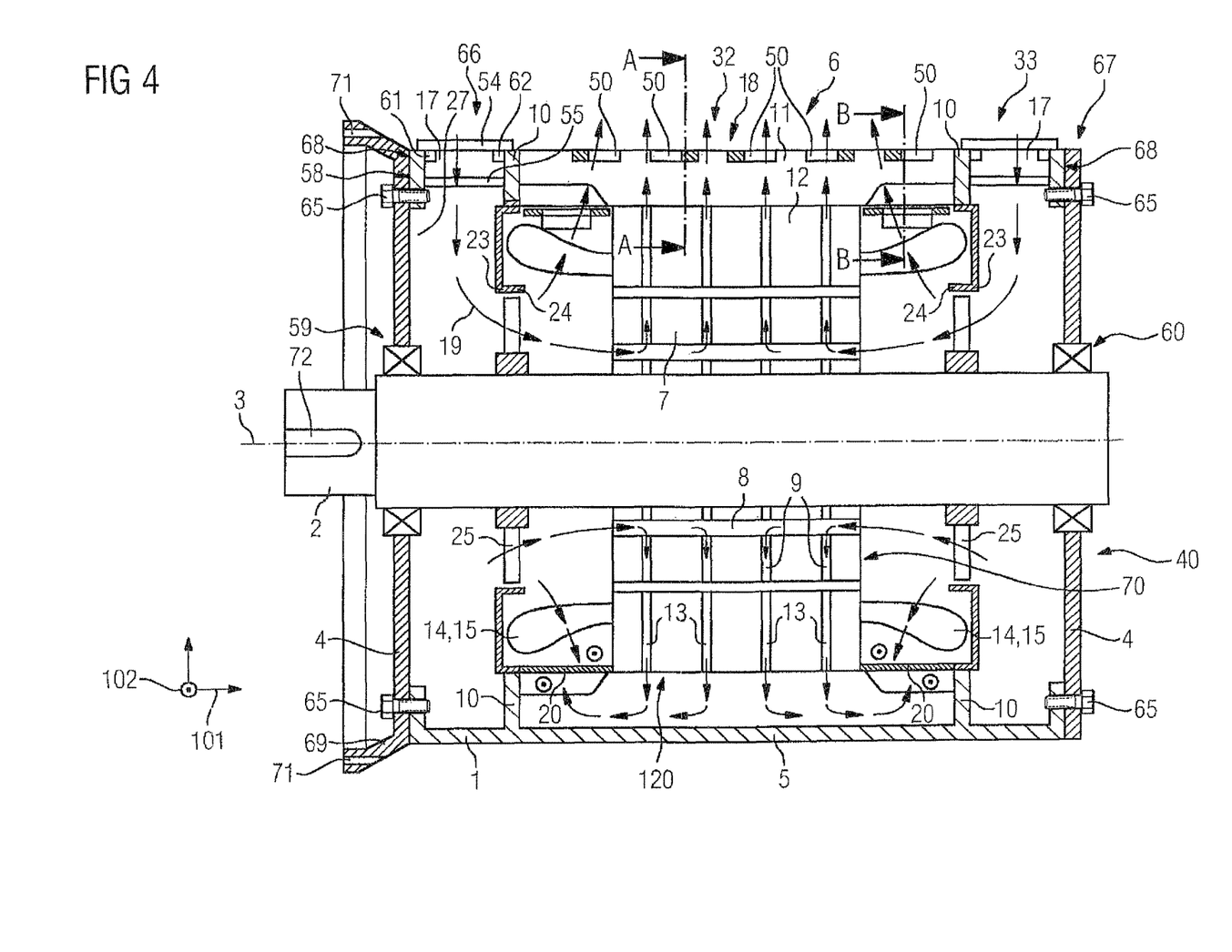
FIG. 4 shows a longitudinal section through an exemplary embodiment of a machine in a second type of embodiment with the molded housing in accordance with the exemplary embodiment according to FIG. 3.

FIG. 4 shows a longitudinal section through an exemplary embodiment of a machine 40 in a second type of embodiment with the molded housing 1 according to the exemplary embodiment depicted in FIG. 3. The machine 40 comprises the molded housing 1 and the shaft 2 passing through the first passage 27, wherein a rotor 70 is fastened to the shaft 2 and in the second region 32 of the molded housing 1 a stator 120 is fixed for interaction with the rotor 70, wherein the molded housing 1 comprises the reinforcement element 34 (covered in FIG. 4 by the second reinforcement element 55), the first securing device 51 and the second securing device 52 (in FIG. 4 the first securing device 51 and the second securing device 52 are covered by the third securing device 61 or the fourth securing device 62 respectively).

When the machine 40 is operating a rotor 70 is set in motion about the axis of rotation 4, which extends in the axial direction 101, and mechanical energy can be output at a shaft 2 to which the rotor 70 is fastened, to a mechanical load in the form of a rotational movement. The forces occurring in this case lead to counter forces in the stator 120, which is fixed in the second region 32. When the machine 40 is operating mechanical energy can also be supplied to the machine 40 via the shaft 2, which also leads to corresponding counter forces at the stator 120. In the machine 40 the shaft 2 is supported in a first bearing shield with the aid of a first bearing device 59 and in a second bearing shield with the aid of a second bearing device 60. The first bearing device 59 and the second bearing device 60 can each have a bearing, e.g. roller bearing, for this purpose. The first bearing shield is attached to the first axial end 66 of the molded housing 1 and the second bearing shield is attached to the second axial end 67 of the molded housing 1 by screws 65 and they form a part of end faces 4, which partly close off the first passage 27 and a corresponding passage of the third region 33.

Especially advantageously an adaptation of an electric machine 40 to a mechanical load caused by operation of the electric machine 40 is advantageously possible at low cost and with high quality. When the electric machine 40 is operated as a generator the rotor 70 is set into rotation about the axis of rotation 3, which extends in the axial direction 101, by mechanical energy. A magnetic interaction between rotor 70 and stator 120 enables the mechanical energy to be converted into electric energy. The electric energy can be taken off for an electrical load at a winding 14 that is fastened to the stator 120. When an inventive electric motor 40 is operated as a motor, electric energy is supplied via the winding 14 and through the magnetic interaction between stator 120 and rotor 70, electric energy is converted into mechanical energy. In this case the rotor 70 is set into rotation about the axis of rotation 3 and mechanical energy can be output at a shaft 2 to a mechanical load in the form of a rotational movement. The rotor 70 is fastened to the shaft 2 and has a rotor laminated core 7. The stator 120 has a stator laminated core 12. Advantageously for an inventive electric machine with the stator 120 in a second region 32 of the molded housing 1, an inventive adaptation can be achieved to a mechanical load in a type of setup through operation of the machine, wherein advantageously at low cost and with high quality the fixing of the stator 120 occurs with no changes or just a few changes in the definitive characteristics of the stator 42 for the magnetic interaction of the stator with the rotor.

In respect of further features, e.g. structure, operation and guidance of cooling air, of the electric machine 40 of FIG. 4 and the effects and advantages associated therewith, reference is made to the contents of the patent with the number EP 2 301 137 B1, the contents of which is hereby incorporated into this application. An assignment of the contents of the text and the contents of FIG. 1 to FIG. 3 of EP 2 301 137 B1 to an inventive electric machine is possible through the fact that FIG. 4 of this invention originates from FIG. 1 of EP 2 301 137 B1. The molded housing 1 can also, in further exemplary embodiments of a molded housing 1 or of a machine 40, have a second region 32 with a cross-section in accordance with FIG. 2 of EP 2 301 137 B1. In EP 2 301 137 B1 the axis of rotation 3 is referred to as the shaft axis 3, the shaft 2 as the rotor shaft 2, the winding as the stator winding and the axial direction 101 as the axial direction.

The molded housing 1 has the second support surface 58 on an axial outer surface 68 of an axial wall 75 of the molded housing 1. Attached to this support surface 58 is a support device 69 with a flange. In the exemplary embodiment of FIG. 4 the support device 69 has the additional function of the first bearing shield. The support device 69 is fastened to the axial outer surface 68 at the first axial end 66. In the exemplary embodiment of FIG. 4 the support device 69 is fastened to the molded housing 1 by screws 65. At the first axial end 66 the shaft 3 has a connecting device 72, with which the electric machine 40 can output mechanical energy to a device to be driven or can accept it from a driving device. To this end the molded housing 1 or the electric machine 40, when the electric machine 40 is operating in a second type of setup, can be supported via the second support surface 58. In this way advantageously at low cost and with high quality, the molded housing 1 or the electric machine 40 can be supported only via the second support surface 58 on a device to be driven or a driving device in operation of the electric machine 40. In the exemplary embodiment according to FIG. 4 the support device 69 can be fastened to the electric machine 40 by means of screws through the holes 71 on the device to be driven or the driving device. As an alternative or in addition, advantageously for specific setup locations, on the second axial end 67 of the molded housing 1, instead of the second bearing shield, advantageously at low cost and with high quality a support device can be attached, which makes it possible to support the molded housing 1 or the electric machine 40 in a second or in a further type of setup.

Figure 5:
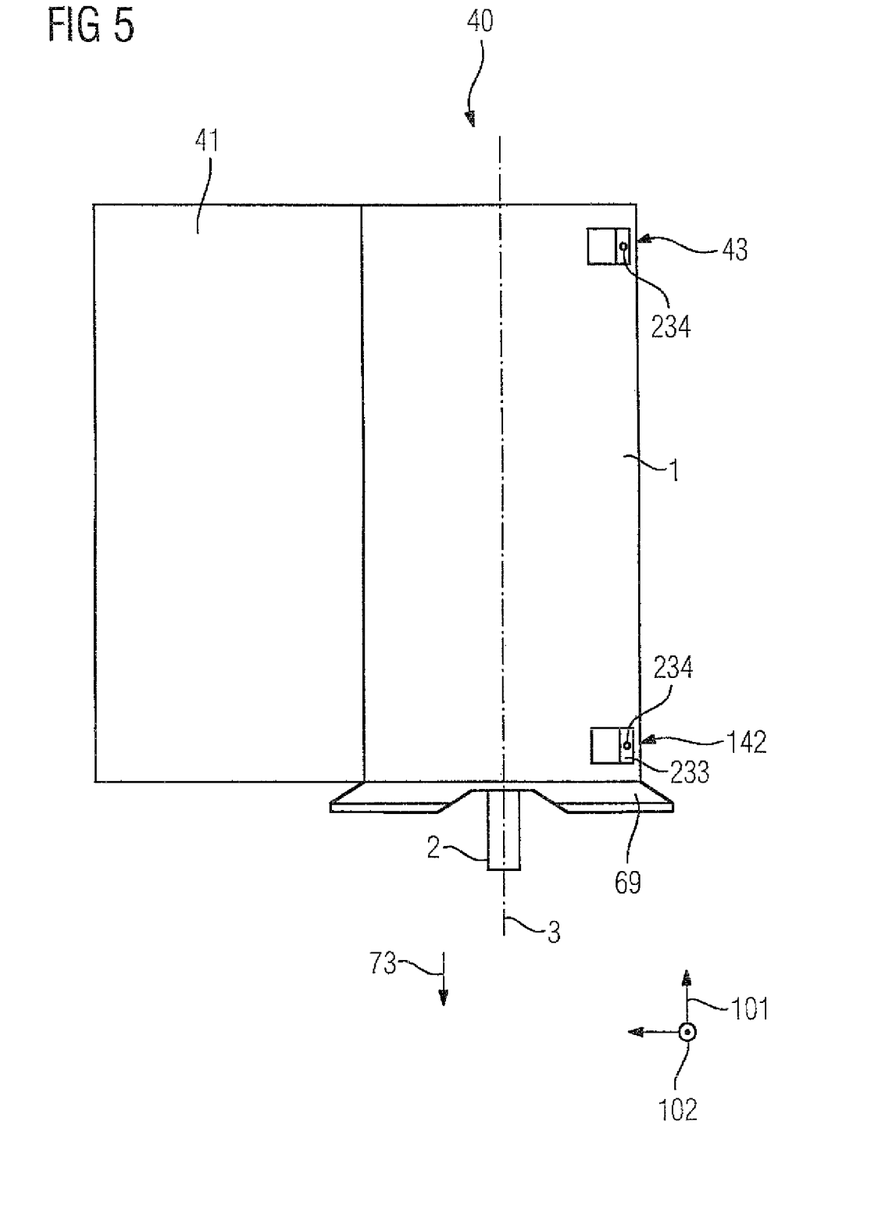
FIG. 5 shows a view of the exemplary embodiment of the machine according to FIG. 4 with a shaft able to be oriented vertically.

FIG. 5 shows a view of the exemplary embodiment of the machine 40 in accordance with FIG. 4 with a shaft 2 able to be oriented vertically. "Vertically" is to be understood here as the shaft 2, of which the axis of rotation 3 extends in the axial direction 101, running essentially in parallel to a direction 73 of the weight force, which acts on the machine 40 in the Earth's gravitational field. An inventive machine, especially an inventive electric machine, is advantageously able to be oriented vertically at low cost and with high quality in relation to the shaft, if with an inventive molded housing the further reinforcement element 36 and/or the second further reinforcement element 54 is built into or fastened to an inventive molded housing. In this way the machine 40 in accordance with FIG. 5 can be installed in a second type of setup in which the shaft is oriented vertically. Slight deviations between the direction of the vertically-oriented shaft and the direction 73 of the weight force can e.g. therefore result in the center of gravity of the machine 40 not lying on the axis of rotation 3. With an electric machine 40 in accordance with FIG. 5 this is only the case to a small degree, since advantageously at low cost a cooling unit 41 on the electric machine 40, by comparison with the electric machine 40, which has the stator 120 with a large mass, has a small mass. The cooling unit 41 has guidance devices that guide flows of coolant out of the openings 17 of the second passage 29 and if necessary, as in the exemplary embodiment of FIG. 4, the opening 18 of the further passage 30, in order to convey the coolant into or out of the electric machine 40 or cool it down via heat exchangers.

The molded housing 1 or the machine 40 can also, in a first type of setup with horizontally oriented shaft, be supported when the machine 40 is operating via the first support surface 142 and the further first support surface 43. In a first type of setup with essentially horizontally oriented shaft the weight force acts in a direction that runs essentially perpendicular to the axis of rotation 3. In order to set up the machine 40 in accordance with FIG. 5 with a horizontally-oriented shaft, feet can be screwed to the molded housing 1 at the holes 234. In this way the support device 69 does not interfere in a setup of the electric machine 40 with a horizontally oriented shaft 2. As an alternative thereto, advantageously at low cost and with high quality, corresponding feet can be molded onto the first support surface 142 and onto the further first support surface 43. As a further alternative thereto, instead of the support device 69, a support device can be fastened to the molded housing 1, which can be fastened independently of the first bearing shield to the first axial end 66 of the machine 40.

In an exemplary embodiment of a method for manufacturing a molded housing 1, said housing is manufactured by molding in one piece with the reinforcement element 34, the second reinforcement element 55, the first securing device 51 and the second securing device 52.

In an exemplary embodiment of a method for manufacturing the machine 40 with a shaft 2, especially the electric machine 40 with the shaft 2, the molded housing 1, which includes the reinforcement element 34, the first securing device 51 and the second securing device 52, is provided for a method step for manufacturing machine 40, especially the electric machine 40. In a method step, depending on an order from a customer based on the type of setup desired by the customer, the further reinforcement element 36 and/or the second further reinforcement element 54 can be fastened to the molded housing 1 or omitted.

In an exemplary embodiment of a method for servicing the machine 40 with a shaft 2, especially the electric machine 40 with a shaft 2, depending on requirements, a further reinforcement element 36 and a second further reinforcement element 54 are fastened to or removed from the first, second or third and fourth securing device 51, 52, 61, 62 on a machine 40, especially the electric machine 40, at an interval in time after its manufacture.

In an exemplary embodiment of a use of a further reinforcement element 36, 54, the further reinforcement element 36 and the second further reinforcement element 54 are fastened to the first and second or third and fourth securing device 51, 52, 61, 62.

Although the invention has been described in greater detail by the preferred exemplary embodiments, it is not restricted to the disclosed examples. Other variations can be derived herefrom by the person skilled in the art, without departing from the scope of protection of the invention.

What is claimed is:

1. A molded housing for a machine with a shaft, comprising:
   a first region, a second region and a third region, said first region, second region and third region being located one after another in an axial direction;
   a first passage for the shaft and a second passage, said first passage having a first molded edge and said second passage having a second molded edge;

a first reinforcement element disposed in the second passage and configured to extend from a first connection point with the second molded edge to an opposite second connection point with the second molded edge;

a first securing device provided at a third connection point on the second molded edge and a second securing device at a fourth connection point;

a wall having an opening in the second passage, with a projection of an imaginary line, which connects the third connection point to the fourth connection point into the opening, intersecting with a projection of the reinforcement element into the opening, said projection of the imaginary connecting line intersecting with the projection of the first reinforcement element at an acute angle; and a second reinforcement element extending from the third connection point to the fourth connection point, said second reinforcement element being fastened to the first and second securing devices.

2. The molded housing of claim 1, wherein the first reinforcement element is connected to the molded housing in a material-to-material bond.

3. The molded housing of claim 1, wherein the second reinforcement element is fixed by a form fit to the first and securing devices.

4. The molded housing of claim 1, wherein the first and second securing devices are connected by a material-to-material bond to the molded housing.

5. The molded housing of claim 1, further comprising:
a third reinforcement element extending from a fifth connection point with the second molded edge to an opposite sixth connection point with the second molded edge;
a third securing device provided on the second molded edge at a seventh connection point; and
a fourth securing device provided at an eighth connection point, with a projection of a second imaginary connecting line between the seventh connection point and the eighth connection point into the opening intersecting with a projection of the third reinforcement element into the opening, said first reinforcement element and said second imaginary connecting line being oriented in similar directions to one another, and the third reinforcement element and the imaginary connecting line being oriented in similar directions to one another.

6. The molded housing of claim 1, wherein the opening of the second passage extends in the axial direction predominantly within a first support surface of the molded housing.

7. The molded housing of claim 1, wherein the opening of the second passage extends in the axial direction predominantly between a second support surface of the molded housing and the second region.

8. The molded housing of claim 7, wherein the second support surface lies on an axial outer surface of an axial wall of the molded housing.

9. The molded housing of claim 1, wherein the second passage is located in the first region.

10. The molded housing of claim 1, wherein the machine is an electric machine.

11. A machine, comprising:
a molded housing having a first region, a second region and a third region, said first region, second region and third region being located one after another in an axial direction;
a first passage for the shaft and a second passage, said first passage having a first molded edge and said second passage having a second molded edge;

a first reinforcement element disposed in the second passage and configured to extend from a first connection point with the second molded edge to an opposite second connection point with the second molded edge;

a first securing device provided at a third connection point on the second molded edge and a second securing device at a fourth connection point;

a wall having an opening in the second passage, with a projection of an imaginary line, which connects the third connection point to the fourth connection point into the opening, intersecting with a projection of the reinforcement element into the opening, said projection of the imaginary connecting line intersecting with the projection of the first reinforcement element at an acute angle;

a second reinforcement element extending from the third connection point to the fourth connection point, said second reinforcement element being fastened to the first and second securing devices;

a shaft extending through the first passage of the molded housing;

a rotor fastened to the shaft; and a stator interacting with the rotor and fixed in a region of the molded housing.

12. A method, comprising:
molding a housing such as to define first, second, and third regions one after another in an axial direction and to form in the first region a first passage for receiving a shaft of a machine, and a second passage defining an opening;
forming in the second passage a reinforcement element between opposite first and second connection points;
forming a first securing device on an edge of the second passage at a third connection point and a second securing device at a fourth connection point, with a projection of an imaginary line, which connects the third connection point to the fourth connection point into the opening, intersecting with a projection of the reinforcement element into the opening, with the projection of the imaginary connecting line intersecting with the projection of the reinforcement element at an acute angle;
forming a further reinforcement element from the third connection point to the fourth connection point; and
fastening the further reinforcement element to the first and second securing devices.

13. The method of claim 12, wherein the machine is an electric machine.

14. A method for servicing a machine with a shaft including a molded housing, comprising:
manufacturing the machine comprising the molded housing, said molded housing including a first region, a second region and a third region, said first region, second region and third region being located one after another in an axial direction;
a first passage for the shaft and a second passage, said first passage having a first molded edge and said second passage having a second molded edge;
a first reinforcement element disposed in the second passage and configured to extend from a first connection point with the second molded edge to an opposite second connection point with the second molded edge;
a first securing device provided at a third connection point on the second molded edge and a second securing device at a fourth connection point;
a wall having an opening in the second passage, with a projection of an imaginary line, which connects the third connection point to the fourth connection point into the opening, intersecting with a projection of the reinforcement element into the opening, said projection of the imaginary connecting line intersecting with the projection of the first reinforcement element at an acute angle; and a second reinforcement element extending from the third connection point to the fourth connection point, said second reinforcement element being fastened to the first and second securing devices;

adapting the machine at a low cost to a mechanical load during operation; and carrying out a servicing of the machine at regular intervals in relation to a manufacturing of the machine.

15. The method of claim 14, wherein the machine is an electric machine.

16. A method of using a further reinforcement element for reinforcing a molded housing, said method comprising:

molding the housing such as to define first, second, and third regions one after another in an axial direction and to form in the first region a first passage for receiving a shaft of a machine, and a second passage defining an opening;

forming in the second passage a reinforcement element between opposite first and second connection points;

forming a first securing device on an edge of the second passage at a third connection point and a second securing device at a fourth connection point, with a projection of an imaginary line, which connects the third connection point to the fourth connection point into the opening, intersecting with a projection of the reinforcement element into the opening, with the projection of the imaginary connecting line intersecting with the projection of the reinforcement element at an acute angle;

forming the further reinforcement element from the third connection point to the fourth connection point; and fastening the further reinforcement element to the first and second securing devices.

17. The method of claim 16, wherein the machine is an electric machine.

* * * * *